United States Patent [19]
Lebowitz et al.

[11] Patent Number: 5,461,186
[45] Date of Patent: Oct. 24, 1995

[54] PROCESS FOR TREATING CONTAMINATED SOIL

[75] Inventors: Howard E. Lebowitz, Mountain View; Conrad J. Kulik, Newark, both of Calif.

[73] Assignee: Electric Power Research Institute, Inc., Palo Alto, Calif.

[21] Appl. No.: 100,737

[22] Filed: Jul. 30, 1993

[51] Int. Cl.⁶ ........................................... B09B 3/00
[52] U.S. Cl. ................................ 588/249; 405/128
[58] Field of Search ................... 405/128, 129, 405/131, 258; 588/249, 252; 210/908, 909

[56] References Cited

U.S. PATENT DOCUMENTS

| | | | |
|---|---|---|---|
| 4,993,873 | 2/1991 | Tippmer | 405/128 |
| 5,019,245 | 5/1991 | Ignasiak et al. | 210/908 X |
| 5,052,858 | 10/1991 | Crosby et al. | 405/128 |
| 5,096,600 | 3/1992 | Hoch | 405/128 X |
| 5,236,282 | 8/1993 | Teasel et al. | 405/128 |

*Primary Examiner*—David H. Corbin
*Attorney, Agent, or Firm*—Fish & Richardson

[57] ABSTRACT

A process is provided for treating soil contaminated with oils, tars and light hydrocarbons. A slurry is formed with coal, water and the contaminated soil and agitated at elevated temperature, resulting in the transfer of the oil from the soil to the coal. The coal and soil mixture is then dewatered for disposal by burning or burial in a landfill.

15 Claims, 2 Drawing Sheets

PROCESS FOR TREATING CONTAMINATED SOIL

The present invention relates generally to a process for treating soil contaminated with oil, tar or other hydrocarbons, and more particularly to a treatment to render such contaminated soil non-hazardous to facilitate its disposal.

BACKGROUND OF THE INVENTION

With the increasing awareness of preventing environmental pollution, there have also been increasing efforts directed to the problems of cleaning up contamination left at abandoned or retired processing facilities. In particular, much effort has been directed to the cleanup of soil contaminated with organic matter, such as oil and tar. There are many sites worldwide where the soil has been contaminated with oil, tar and other hydrocarbon residues. A variety of coal/petroleum-based industrial sites have soil contaminated by spills that may occur during oil production or transportation, or from tailing ponds produced during heavy oil production. These sites include former manufactured gas plant (MGP) sites, where tar and oil from gas production were often disposed of near the production facilities.

One method used in the cleanup of soil contaminated with petroleum by-products and MGP residual wastes is the disposal of such contaminated soils by incineration at a power plant. This method is simple, relatively inexpensive and effective as a treatment for disposing of the contaminated soil. However, this method of treatment is no longer allowed under the Resource Conservation and Recovery Act (RCRA), if the contaminated soil is considered hazardous.

The Environmental Protection Agency (EPA) considers a material to be hazardous when certain chemicals can be leached out in concentrations above predetermined thresholds. EPA employs a leaching test known as the Toxicity Characteristic Leaching Profile (TCLP) test to determine whether a material should be classified as hazardous. Contaminated soils from MGP sites will often be classified as hazardous, as determined by the TCLP test, because chemicals, such as benzene, toluene, ethyl benzene, xylene, among others (also known in the industry as "BTEX"), will leach from the soil.

For instance, soil which produces a leachate of 500 ppb. of benzene in the TCLP test is currently considered to be hazardous. Beyond the current EPA requirements, leachability of compounds is a common regulatory criteria for judging contaminated soils. Environmental standards are also being considered for other compounds, such as polycyclic aromatic hydrocarbons (PAH).

Another method for cleaning soil contaminated with petroleum by-products is to process the soil with coal and water. Such a process is described in U.S. Pat. No. 5,019,245. The process produces clean soil and coal agglomerates using flotation, wherein the agglomerates will contain the bulk of the oils, tars and other hydrocarbon residues. However, the extraction of oil-contaminated soils by hot water processing and flotation may not always be possible due to either poor flotation response, poor selectivity and/or the generation of froth that is difficult to handle. In addition, the high viscosity of hydrocarbon contaminants, as well as the presence of charred materials with particle sizes over 0.6 mm, can contribute significantly to the poor release of contaminants from the soil.

While the typical approach for treating contaminated soil is to remove the contaminants, the present invention is directed to a method for treating oil and tar contaminated soil that will render the soil non-hazardous by eliminating or reducing the tendency of hazardous hydrocarbons to leach out. The soil can thereafter be disposed of by conventional methods, e.g., burning or burial in a landfill.

An object of the present invention is to provide an inexpensive process for cleaning soil contaminated with oil, tar and other hydrocarbon residues.

Another object of the present invention is to provide a treatment for contaminated soil that will render the soil non-hazardous.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the claims.

SUMMARY OF THE INVENTION

The present invention is directed to a process for treating soils contaminated with an organic composition comprising tar, oil, and/or other hydrocarbons by mixing the contaminated soil with pulverized coal and water. The coal-soil-water mixture is agitated at elevated temperature to cause the transfer of the tar, oil and other hydrocarbons to the coal and to volatilize any low-boiling hydrocarbons. The mixture is dewatered to produce a product that will be non-hazardous, according to TCLP test or similar leaching tests, and that can be disposed of as such.

According to the present process, the contaminated soil is placed into a vessel with coal and hot water. A suitable vessel for mixing the coal, soil, water mixture would be a cylindrical vessel rotating about a horizontal axis. Alternatively, a stirred vessel may be used. The weight ratio of coal to oil in the soil should be in the range of 0.5 to 40. The coal-soil-water mixture will have a solid concentration range of about 25 to 90 percent. The mixing vessel is maintained at approximately atmospheric pressure.

The mixture is tumbled or stirred for about 5 to 60 minutes to allow the coal, water and soil to mix thoroughly so that the oil, tar and other hydrocarbons will be substantially transferred to the coal. Appropriate temperature conditions are in the range of about 60° to 95° C. If the soil contains a substantial amount of tar and heavy oil residues, it is preferred that the mixture be maintained at a temperature in the range of about 85°–95° C. and at a pH in the range of about 7 to 9.

The water may be heated in the mixing vessel or using a separate heater. It is preferred that part of the water be heated under pressure to a temperature above the atmospheric boiling point to cause the water to vaporize upon entering the mixing vessel. Steam may also be added to the water. Any benzene, toluene, ethyl benzene, xylene, low boiling point hydrocarbons, etc. (BTEX) in the soil will be substantially volatilized, and the vapors (water and BTEX) removed from the vessel for further treatment.

The coal-soil-water mixture is removed as a slurry and is screened to separate coarse particles. Often, soil from MGP sites will include, as coarse particles, coke particles that contain tar and/or oil occluded within them. The mixture from the mixing vessel is screened into two size classifications. The screen size is chosen so that the pulverized coal will pass through the screen. The oversized coarse materials are separated into a low gravity fraction that is mostly coke and a high gravity fraction that is mostly mineral matter. The low gravity (coke) fraction is crushed and reduced to a size smaller than the screen opening for recycling with the fresh coal feed. Upon subsequent processing, any occluded oil present with the coke will be absorbed by coal and/or finely divided coke particles.

In addition, it may be desirable to modify the present process by further heating the slurry of fines, after the slurry is screened, in a separate vessel or series of vessels. During this additional heating step, steam may be optionally added to assure the complete remove of BTEX.

The slurry is dewatered using conventional processing equipment. The coal will have an attraction for the oils and tars which will prevent their leaching out from the mixture. The recovered BTEX is appropriately disposed of by conventional means.

BRIEF DESCRIPTION OF THE DRAWINGS

The accompanying drawings, which are incorporated in and constitute a part of the specification, schematically illustrate the invention and, together with the description given below, serve to explain the principles of the invention.

DESCRIPTION OF THE INVENTION

Figure 1:
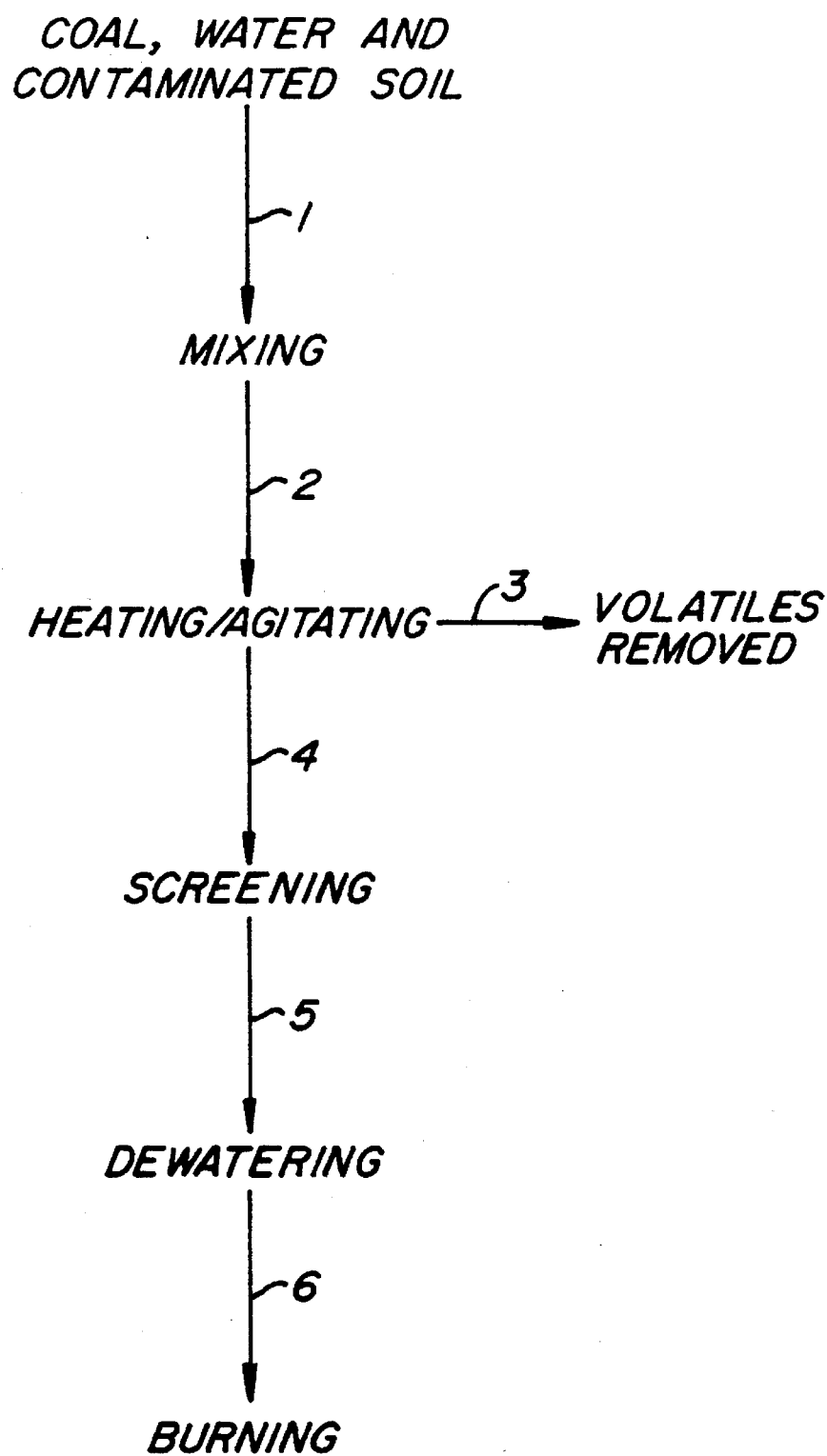
FIG. 1 is a flow chart showing the preferred steps according to the present invention.

The present invention is directed to rendering contaminated soil non-hazardous by using a treatment that combines the contaminated soil with coal and water under elevated temperature conditions.

As defined herein, the term "contaminated soil" comprises sand, soil and/or other inorganic solid substrates that can be physically mixed with an organic composition comprising oil, tar and/or other hydrocarbons.

In general, the contaminated soil is first combined with pulverized coal and water to form a mixture or suspension. The ratio of coal, dry basis weight, to the approximate weight of the organic oily composition in the contaminated soil is in the range of about 0.5 to 40. However, for samples with low oil content, the amount of coal added will be at least 5% of the dry weight of the soil, and preferably in the range of 5–15%. The preferred weight ratio of coal to oil/tar is in the range of 4–20. Various types of coal may be used, including anthracite, bituminous and subbituminous coals, such as well chars, cokes and any type of activated carbon. The coal is ground to a particle size, that passes through sieves having openings in the range of about 300–600 micrometers.

According to the present invention, the coal, soil and water can be combined, heated and agitated in one vessel as a single step. However, it is preferred that either the water and soil be pre-mixed and then the coal added thereto or the coal and water be pre-mixed and the soil added thereto. The mixing of the soil-water or coal-water is preferably carried out in a separate vessel.

It is preferred that the mixture be agitated at a temperature in the range of about 60°–90° C. When initially forming the soil-water mixture or coal-water mixture, the water may be pre-heated to the desired temperature or the mixture can be heated.

According to a one embodiment, the contaminated soil is combined with sufficient hot water to form a solids concentration in the range of about 25–90 percent by weight. The soil-water mixture is then further heated as required to a temperature in the range of about 60°–90° C. Thereafter, the ground coal, preferably of a size that is 600 micrometer or less, is added to the hot soil-water mixture in an amount to obtain a weight ratio of coal (dry basis) to oil/tar that is in the range of about 10–20. The mixture is agitated for approximately 5 to 45 minutes. To determine the coal/oil ratio, it is necessary to estimate the approximate amount of the oil, tar and/or other hydrocarbon present in the contaminated soil to be processed. This amount may be readily determined by solvent extraction methods.

In an alternative embodiment, when the contaminated soil comprises a substantial amount of tar, as is often found in the bottoms from various petroleum refining processes, a slurry of the ground coal and water is first formed. It is preferred that the coal-water slurry be formed from finely ground coal, preferably of a size that is 600 micrometer or less, and that the slurry be formed by adding the coal to water. The pH of the water is preferably in the range of about 7–9. The water is heated to a temperature in the range of 75°–95° C. The contaminated soil containing the tar is then mixed into the hot coal-water slurry in a amount to result in a ratio of coal (dry basis) to tar is in the range of about 5–15. In order to determine this ratio, it is again necessary to determine the approximate amount of oil, tar and other hydrocarbons contained in the soil being processed. Generally, less coal is needed when the soil contains a greater tar content.

The mixture is then agitated at a temperature within the range of about 60°–95° C. The mixture will be tumbled preferably in a drum for about 5–60 minutes and then passed through on screens having openings in the range of 0–1.0 and 1–4.75 mm to separate the coarse particles (typically tar and oil-free rock) from the mixture.

A process flow diagram is shown in FIG. 1. In step 1, the coal-water or soil-water are mixed to form a slurry. The third component, either soil or coal, can then be added to the slurry. In step 2, the slurry is agitated and heated, for example, in a rotating tumbler, and steam may be added. The volatile BTEX components (benzene, toluene, xylene, and etc.) of the soil contaminants are removed as vapor in step 3 and, for example, can be catalytically burned. Removal of BTEX is important since the presence of these compounds often lead to a hazardous classification by EPA. The effluent from the tumbler is screened in step 4. The coke and rocks are separated by a screen upon exiting the tumbler and are separated by gravity using jigs. In steps 5 and 6, the slurry is dewatered and the final product is then burned on site or transported to a suitable facility for burning or burial.

The present process can be carried out as sequence of batch steps or as a continuous process, which is preferred. The soil is rendered non-hazardous by the present process. The final product will typically contain BTEX concentrations in the range of about 0–100 ppb. Separation of the coal is not necessary since the entire mixture may be burned at a power plant.

Figure 2:
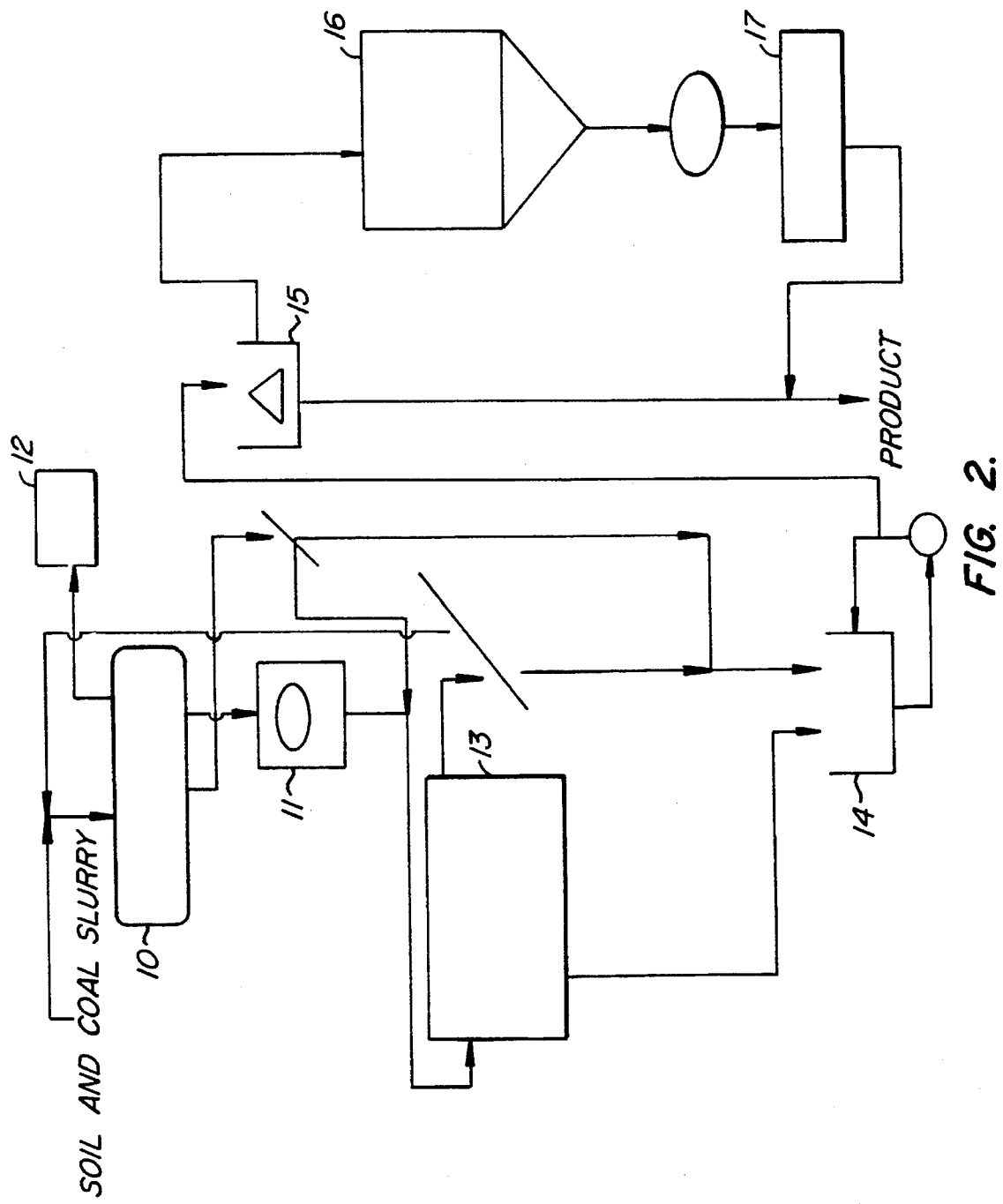
FIG. 2 is a schematic diagram of apparatus for use of the method according to the present invention.

Referring to FIG. 2, apparatus that can be used to produce single product according to the present invention is shown. The coal, soil and water are mixed, as described above, and introduced into a tumbler 10 for agitation at an elevated temperature. Steam may be added to tumbler 10. The low boiling hydrocarbon contaminants are vaporized and removed to a catalytic converter 12. The effluent from tumbler 10 is screened and the oversize portion is directed to a crusher 11. The oversize particles will consist primarily of rock and coke. After crushing, the rock and coke particles are separated by specific gravity in jigs 13.

The separated coke is redirected back to tumbler 10. The coal-soil-water mixture is placed in a settling tank 14. The mixture is then substantially dewatered in a centrifuge 15. Very fine particles suspended in the water are directed to a thickener 16 and subsequently passed through a filter 17. The final product can be compacted into a form suitable for handling and transporting.

The fuel will sometimes contain little or no coke particles. In this case, processing by the crusher 11 and the jig 13 are not required. If little no coke particles are present, the product from the tumbler 10 may be dewatered as the single product, or alternately may be separated as a screen into oversize and undersize fraction which might be disposed of separately.

EXAMPLE

A soil from an MGP site was treated as indicated below by the method of this invention. The soil was processed in a rotary vessel.

CONDITIONS

Coal weight: 10% of dry weight of soil (coal/tar ratio 15)
Temperature: 85°–90° C.
Time: 30 minutes

SOIL COMPOSITION

Feed:

0.7% tar content (total toluene solubles)

b. 1136 ppb BTEX in TCLP leachate c. 358 ppb PAH in TCLP leachate

Product:

a. 0.05% tar content b. Non-detected BTEX in TCLP leachate c. 49 ppb PAH in TCLP leachate The process of the present invention can be performed by a facility that is designed to handle large volumes of contaminated soil. It is also envisioned that the present process can be performed by a mobile unit that may be transported to a site where the contaminated soil is located. The mobile processing equipment may taken to "hot spots" to treat the contaminated soil, thereby reducing the cost of the cleanup.

Finally, since numerous modifications and changes will readily occur to those skilled in the art, it is not desire to limit the invention to the exact construction and operation shown and described, and accordingly all suitable modification and equivalents may fall within the scope of the invention.

The present invention has been described in terms of its various embodiments, which are considered as illustrative only of the principles of the invention. The invention, however, is not limited to the embodiment depicted and described.

What is claimed is:

1. A process for treating soil contaminated with an organic composition comprising oil, tar and/or other hydrocarbons by the steps comprising:

(a) mixing said soil with pulverized coal and water to form a mixture;

(b) agitating said mixture at a temperature in the range of about 60°–95° C. to vaporize low boiling hydrocarbon soil contaminants in said mixture and to substantially transfer the remaining organic composition from said soil to said coal;

(c) screening said agitated mixture from step (b) to remove any particles of greater than a predetermined size; and (d) dewatering said screened mixture from step (c) to produce a mixed coal-soil solid product.

2. A process according to claim i wherein step (a) further comprises pre-mixing said soil and water, and subsequently adding said coal.

3. A process according to claim 1 wherein step (a) further comprises pre-mixing said coal and water, and subsequently adding said soil.

4. A process according to claim 1 wherein the weight of said organic composition in said soil is determined by a solvent extraction method.

5. A process according to claim 1 wherein said mixture of step (a) has a solids concentration in the range of about 25–90 percent.

6. A process according to claim 1 wherein in step (b) said mixture is agitated for about 5 to 45 minutes.

7. A process according to claim 1 wherein the amount of said coal mixed with said soil constitutes at least five percent of said soil by weight, dry basis.

8. A process according to claim 1 wherein in step (c) said predetermined size is about 600 micrometers or less.

9. A process according to claim 1 wherein said coal-soil solid product contains a BTEX concentration of about 100 ppb. or less.

10. A process according to claim 1 wherein step (b) further comprises adding steam to heat said mixture.

11. A process according to claim 1 wherein said soil is processed in a continuous manner.

12. A process according to claim 11 wherein step (c) further comprises heating said screened mixture in a separate vessel following screening to vaporize any remaining low boiling hydrocarbons.

13. A process according to claim 12 wherein steam is introduced into said vessel to facilitate removal of BTEX.

14. A process according to claim 1 wherein the ratio of said coal, by dry weight, to the weight of said organic composition in said soil is in the range of about 0.5 to 40.

15. A process according to claim 1 wherein the temperature of said mixture is in the range of about 85° to 95° C. during the agitation step (b).

\* \* \* \* \*